Patented June 2, 1953

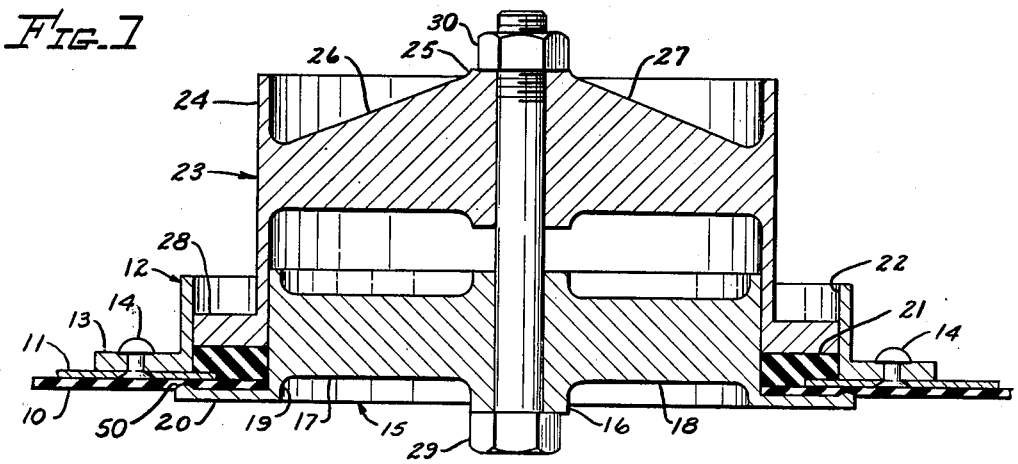
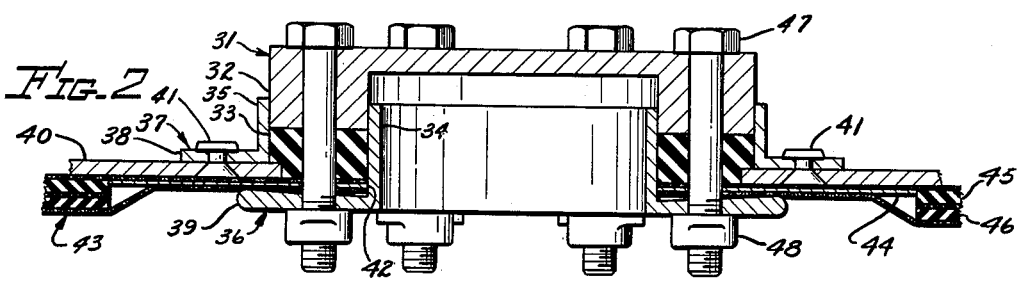
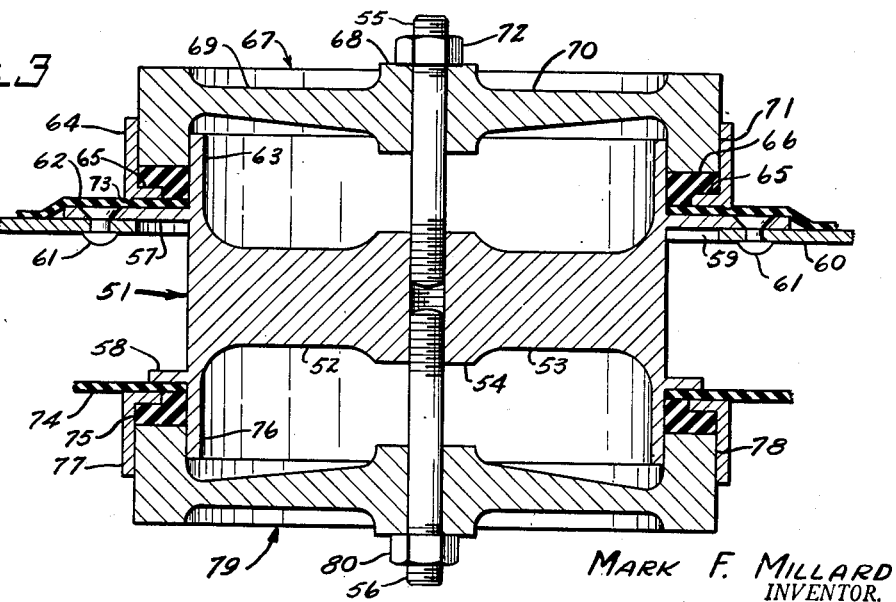

2,640,493

UNITED STATES PATENT OFFICE 2,640,493

FITTING FOR FLEXIBLE FUEL CELLS

Mark F. Millard, Wichita, Kans., assignor to Boeing Airplane Company, Wichita, Kans., a corporation of Delaware Application February 6, 1952, Serial No. 270,123

10 Claims. (Cl. 137—571)

This invention relates to fittings for the openings in the walls of flexible fuel cells such as are used in present day airplanes, and more particularly to a unique type of fluid seal for such fittings. Specifically involved are access door fittings, drain valve fittings, filler opening fittings, tank or fuel cell interconnecting fittings, and others.

The walls of the mentioned flexible fuel cells are ordinarily made of several bonded layers of a rubber impregnated fabric material, the margins of the fitting openings in the cell wall being provided with extra bonded layers of rubber-like material which constitute an integral sealing gasket for the opening. This gasket material has an inherent tendency to contract when cold, and to gradually "flow" outward when it is placed under continuous pressure. It is common practice to seal the necessary fittings to the fuel cells by clamping the gasketed margin of the fuel cell opening between two flat metal rings, or between two spiders, which constitute a part of the fitting structure. The clamping pressure is applied to the rings by annularly spaced bolts, or in the case of two spiders, by a single central bolt, the latter being considered best because it distributes the clamping pressure more evenly than do the spaced bolts. In either case the required clamping pressure is obtained by gaging the torque applied to the bolts in inch/lbs. In such prior constructions the gasketed margin of the fuel cell opening which is clamped between the rings gradually "flows" outward, and in doing so becomes thinner in the clamped area. The original clamping pressure is thus actually reduced, due to this cold flow characteristic of the gasket material, and the original fluidtight seal between the fitting and the fuel cell is thus destroyed. A similar loss of original sealing pressure, and consequent loss of fluidtight seal occurs when the cells and conventional attached fittings are subjected to extremely cold temperatures. This is due primarily to the fact that the pressure transmitting spider of the fitting contracts to a greater degree than does the central bolt which exerts the sealing pressure on the spider. The effect is the same as if the nut on the bolt had actually been partially unscrewed.

It is the primary object of this invention to eliminate the above described disadvantages of presently available fuel cell fittings by providing a fitting which utilizes a rubber-like sealing gasket which is entirely separate from the fuel cell wall, and which is physically confined against "cold flow" in any direction.

It is an additional object of the invention to provide a fluid seal construction for fuel cell fittings which eliminates the necessity for bonding extra annular layers of rubber-like gasket material around fuel cell openings.

It is a still further object to provide a fluid seal construction which may be built into numerous and various types of fuel cell fittings.

In general the invention comprises a pair of telescoped tubular members of different diameters forming an annular groove between them, the innermost member having an external flange which bridges the groove at one end. The margin of the fuel cell opening extends radially inward between the flange and the adjacent end of the outer tube. The gasket material is entirely omitted from the margin of the fuel cell opening, and instead is confined within the groove. An annular boss telescopes into the groove and compresses the gasket material against the margin of the opening and against the flange. Being entirely confined the gasket material cannot possibly "flow" in any direction, and a positive seal is obtained.

The invention, together with other objects, will be more clearly understood when the following description is read in connection with the accompanying drawing in which:

Fig. 1 is a vertical central sectional view of an inlet or outlet duct fitting embodying the invention, and shown mounted in an opening in the wall of a bladder type fuel cell;

Fig. 2 is a similar view of a fuel cell access door fitting embodying the invention, the fitting being installed in an opening in the wall of a self-sealing type fuel cell, shown fragmentarily;

Fig. 3 is a similar view of a fuel cell interconnector fitting embodying the invention, and shown connecting the interiors of two different bladder type fuel cells.

Referring to Fig. 1 of the drawings, the numeral 10 designates the wall of a bladder type flexible fuel cell, and 11 a bulkhead or other rigid part of the aircraft structure housing the cell. The cell wall is provided with a circular opening which is positioned concentric with a circular opening of slightly larger diameter cut through the bulkhead. The numeral 12 designates an outer cylindrical guide having a peripheral annular flange 13 which is rigidly secured to bulkhead 11 by means of flush head rivets 14, the bore of this guide 12 being concentric with the openings in the fuel cell wall and bulkhead, and slightly larger in diameter than the latter. The numeral 15 designates an inner guide in the form of a spider having a centrally located axially bored boss 16 supported rigidly by a plurality of integral radial vanes 17—18, which in turn are integral with a cylindrical wall 19. The outside diameter wall 19 is approximately the same as the diameter of the fuel cell opening so that this wall may project outward through the cell opening, as shown. Wall 19 has a peripheral flange 20 at its inner end, the outside diameter of which is equal to or preferably greater than the diameter of the cylindrical wall of guide 12.

An annular sealing gasket 21 of rubber-like material, such as neoprene, is seated at the bottom of the annular groove 22 formed by the cooperating cylindrical walls of the guides 12 and 15, with a portion of the bottom surface of the gasket in direct flat contact with the marginal portion of the fuel cell opening, which projects circumferentially into this groove between the bulkhead and flange 20.

A spider, designated as a whole by the numeral 23, includes a cylindrical wall portion 24, a concentric axially bored boss 25, and radial vanes 26—27 located at the upper or outer end of wall 24 only, and integral with the wall and boss. At its lower or inner end spider 23 carries a heavy peripheral flange 28 which has an outside and inside diameter such as to permit it to telescopically enter the groove 22 loosely, and seat on the outer surface of gasket 21 for applying pressure thereto.

A bolt 29 passes through both bosses 16 and 25, and a nut 30 complete the assembly. It will be easily understood that torque applied to the nut 30 will force spider 23 toward spider 15, and will simultaneously apply a sealing pressure against both surfaces of the marginal portion of the fuel cell opening, pressure being directly applied by the flange 20 and by the gasket 21. Since gasket 21 is completely confined by walls 12 and 19, flange 28, and flange 20, there can be no flow of the gasket material due to continuous sealing pressure. The initial sealing torque applied to nut 30 should be sufficient to maintain the required sealing pressure against the margin of the cell opening at extremely low temperature. This torque can be established by test, but will ordinarily be around 125 in./lbs. At the sealing pressure resulting from the suggested torque, the resiliency of the confined gasket 21 will be sufficient, even at a temperature of −65° F., to maintain a fluidtight seal against the margin of the fuel cell opening. The gasket resiliency, in other words, will compensate for the contraction in length of the spider 23. Thus a seal has been provided which eliminates the fuel leakage which frequently arises in conventional fittings either as a result of cold flow of the sealing material at normal temperatures, or as a result of unequal contraction of the fitting parts at extremely low temperatures.

While there is very little tendency for the tank wall material at the margin of the opening to cold flow, a low annular bead 50 may be provided at the outer edge of flange 20 to further confine the margin against which the sealing pressure is being exerted. This is not an essential part of the invention, and is used only when the wall of the fuel cell is exceptionally thick, or is impregnated with an excess amount of rubber or other similar material.

That embodiment of the invention illustrated in Fig. 2 employs the same sealing principle as the above described fitting, and the cooperating parts are similar. The Fig. 2 fitting is for an access door 31, which has an integral depending annular rim 32, the bottom of which seats on and applies pressure against a resilient gasket or packing 33, confined in an annular groove formed by concentric cylindrical walls 34 and 35 of inner and outer guides 36 and 37. These guides have outwardly projecting peripheral flanges 38 and 39, as shown. Flange 38 is rigidly secured to bulkhead 40 by rivets 41, in a position concentric to the bulkhead opening. The bottom or inner surface of the gasket seats flat against the concentric marginal portion 42 of the opening in the fuel cell wall 43. In the case of a self-sealing type flexible fuel tank, illustrated, the margin of the opening is preferably reinforced by a thin sheet metal ring 44 bonded between two fabric plies of the cell wall. The cell wall layers 45 and 46 of latex sealing compound are omitted so that the margin material will have little or no tendency to cold flow.

Sealing pressure is applied by means of bolts 47 and nuts 48. The bolts are circumferentially spaced around the access door and pass through the rim 32, gasket 33, margin of opening 42, and flange 39. Torque applied to nuts 48 exerts sealing pressure on margin 42 by compressing confined gasket 33 toward flange 39.

A fitting for interconnecting the interiors of two adjacent fuel cells is illustrated in Fig. 3, and employs the same sealing principle.

A cylindrical rigid duct 51 has a plurality of internal radial vanes 52—53, integrally supporting a concentrically bored and threaded boss 54 within which are mounted two outwardly projecting studs 55 and 56. Exteriorly this duct is provided with two integral outwardly projecting annular flanges 57 and 58 which are spaced inwardly from the respective ends of the duct. Flange 57 is rigidly secured to the margin of a circular opening 59 in bulkhead 60 by means of flush head rivets 61. Fuel cell wall 62 is provided with a circular opening just large enough to receive the end 63 of the duct, and the margin of this opening is positioned flat against the outer surface of flange 57.

An outer guide has a cylindrical wall 64, of larger diameter than duct 51, and a flange 65. The walls 63 and 64 together form an annular groove to receive resilient gasket 66, a major portion of which seats directly on the fuel cell wall 62. It will be noted that a portion of flange 65 extends radially inward from wall 64, and that a portion of gasket 66 seats on this inwardly extending portion of the flange. Sealing pressure applied to the gasket 66 thus holds guide 64 in position.

A spider 67 includes an axially bored central boss 68, integral radial vanes 69—70, and an integral depending annular rim 71 of a diameter and radial thickness to telescopically seat loosely in the groove formed by walls 63 and 64. Bolt 55 is received in the bore of boss 68, and nut 72 applies sealing pressure to gasket 66 through rim 71. A cold flow retarding annular bead 73 is provided near the peripheral edge of flange 65 if the wall of the particular cell to which the fitting is to be applied has any inherent tendency to flow under pressure. Otherwise the bead may be omitted.

The opposite end of the Fig. 3 interconnector fitting includes parts corresponding to those already described, except that there is no supporting bulkhead corresponding to bulkhead 60. The margin of the opening in fuel cell wall 74 seats flat against flange 58. Gasket 75 is confined between wall 76 and guide wall 77. The rim 78 of spider 79 seats on gasket 75. Sealing pressure is applied to the gasket through bolt 56 and a nut 80. With the construction described it will be seen that the seal at either end of this fitting may be broken and the fuel cell removed without in any way disturbing the liquidtight seal at the other end of the fitting.

Having described several embodiments of the invention with sufficient clarity to enable those familiar with this art to construct and use it, I claim:

1. A fitting for fluidtight attachment in a circular opening in a flexible wall of a container comprising: a pair of concentric tubes, the innermost tube projecting snugly through the wall opening and having an integral perpendicular annular flange seated flat against one surface of the margin of the opening, one end of the outer tube being positioned adjacent the opposite surface of said margin; said flange laterally bridging the space between the inner tube and the adjacent portion of the outer tube, said margin extending between the margin seated flange and the adjacent portion of the outer tube at the bottom of the annular groove formed between the two tubes; gasket material in said groove seated on said margin; a fitting member having a thick walled tubular rim telescopically seated in said groove on said gasket material; and means urging said rim toward said flange to compress the gasket material against the margin of the wall opening, the groove serving to confine said gasket material against cold flow due to pressure.

2. The invention described in claim 1, and a perpendicular annular flange carried integrally at the inner end of the outer tube.

3. The invention described in claim 2, and a fixed plate type support having a circular opening, the margin of the support opening being concentrically seated on one surface of the flange on the outer tube; and means connecting the support and the seated flange.

4. A fitting for fluidtight attachment in a circular opening in a flexible wall of a container comprising: a pair of concentric tubes, the innermost one projecting snugly through the wall opening and having an integral perpendicular annular flange seated flat against one wall surface adjacent the opening, the outside diameter of said flange being greater than the inside diameter of the outer tube, the flexible wall of the container extending inward between the flange and the adjacent end of the outer tube and located at the bottom of the annular groove formed between the two tubes; gasket material at the bottom of said groove seated on the margin of the opening in the container wall; a fitting member having a thick walled tubular rim complementally and reciprocably received in said groove with its inner end seated on said gasket material; and means urging said rim toward said flange, the groove confining said gasket material against cold flow during the time the gasket material is under compression.

5. A fitting for fluidtight attachment in a circular opening in a flexible wall of a container comprising: a first tube closely fitted in and projecting through said opening and having an integral perpendicular annular flange seated flat against one surface of the margin of the opening; means including a second tube of larger diameter than the first tube concentrically surrounding the first tube and seated on the opposite surface of said margin, and forming with the first tube an annular groove open at one end only, the bottom of the groove being closed by the margin of the opening backed by said flange; gasket material in said groove seated on said margin; a fitting member including a thick walled tubular rim telescopically seated in said groove on said gasket material; and means urging said rim toward said flange to compress the gasket material against the margin of the wall opening, the groove serving to confine said gasket material against cold flow due to pressure.

6. A fitting for fluidtight attachment in a circular opening in a flexible wall of a container comprising: a first tube closely fitting in and projecting through said opening and having an integral perpendicular annular flange seated flat against one surface of the margin of the opening; a second tube concentrically surrounding the first tube and having an integral perpendicular annular flange at one of its ends seated against the opposite surface of said margin, the inside diameter of the flange on the second tube being greater than the diameter of the first tube, and the two tubes together forming an annular groove between them with a margin of the wall opening exposed at the bottom of the groove and backed by the flange on the first tube; gasket material in the groove seated on the exposed margin of the wall opening; a fitting member having a tubular rim complementally and slidably seated in said groove on said gasket material; and means urging said rim toward the flange on the first tube to compress the gasket material against said margin, the groove confining said gasket material against cold flow due to pressure.

7. A fitting for fluidtight attachment in a circular opening in a flexible wall of a container comprising: a first member having a tubular portion closely fitted in and extending through said opening, and having an integral outwardly projecting annular flange seated flat against one surface of the flexible wall adjacent the opening; a second member having a larger diameter tubular portion concentrically surrounding the tubular portion of the first member and having one of its ends seated against the opposite surface of the flexible wall adjacent the opening therein, thus leaving the flange seated portion of the wall exposed at the bottom of the annular groove formed between the two concentric tubular portions of the two members; gasket material in said groove in contact with the exposed portion of the wall therein; a fitting member having an annular rim telescopically seated in said groove with its inner end seated on said gasket material; and means urging said rim toward said flange to compress the confined gasket material against the adjacent wall portion of the container.

8. A fitting for fluidtight attachment in a circular opening in a flexible wall of a container comprising: a first member having a tubular portion closely fitted in and extending through said opening, and having an integral outwardly projecting annular flange seated flat against one surface of the flexible wall adjacent the opening; a second member having a larger diameter tubular portion concentrically surrounding the tubular portion of the first member, the tubular portion of the second member being smaller in diameter than the outside diameter of said flange, and having one of its ends seated against the other surface of the flexible wall thus leaving an annular portion of the wall exposed between the concentric tubular portions of the two members; gasket material in the annular space between the two tubular portions and in contact with the annular exposed portion of the container wall; a fitting member having a depending annular rim telescopically seated in the annular space between the two tubular portions with its inner end in contact with said gasket material; and means urging said rim toward said flange to compress the confined gasket material against the exposed portion of the container wall.

9. A fitting for a circular opening in a flexible wall of a liquid container comprising: two separate annular members of different diameters arranged concentrically, each including a tubular portion and in integral outwardly projecting annular flange, the smaller member having its tubular portion projecting through said opening and its annular flange seated flat against one wall surface of the container adjacent the opening, the larger member having its flange seated flat against the opposite wall surface of the container adjacent but peripherally spaced from the opening, the two tubular portions thus forming an annular groove at the bottom of which is the margin of the opening in the container; gasket material seated in said groove against the exposed surface of the margin of said opening; a fitting member having a depending annular rim of a size to complementally and slidably enter said groove; and means urging said fitting member and the smaller of said annular members toward each other, whereby the rim of the fitting member forces the gasket material against the margin of the opening in the container wall and a fluid-tight seal is produced.

10. An interconnector fitting for fluidtight attachment in aligned circular openings in adjacent flexible walls of two containers to afford leakproof communication between them, comprising: a cylindrical duct having its opposite ends closely fitted in and projecting through said openings into the interiors of the respective containers; two spaced annular flanges carried externally by said duct and seated flat against the respective exterior surfaces of the margins of the respective container wall openings; two separate tubes each concentrically surrounding a respective end of said duct, one end of each tube being positioned adjacent the interior surface of the margin of its adjacent wall opening, the flanges bridging the space between the duct and the adjacent portions of the respective tubes, the margins of the respective wall openings extending inward between the respective flanges and the adjacent ends of the respective tubes into the bottoms of the respective annular grooves formed between the two tubes and the respective opposite ends of the duct; gasket material in each of said annuar grooves seated on the margins of the respective container wall openings; two spider type fitting members each having a thick walled tubular rim telescopically seated in a respective one of said grooves on the gasket material therein; and means urging the respective rims toward the respective flanges to compress the gasket material against the respective margins of the wall openings, the grooves serving to confine the gasket material against cold flow due to sealing pressure.

MARK F. MILLARD.

References Cited in the file of this patent

UNITED STATES PATENTS

| Number | Name | Date |
|---|---|---|
| 787,298 | Keller, Jr. | Apr. 11, 1905 |
| 1,527,831 | Borgner | Feb. 24, 1925 |
| 1,643,500 | Jacobson et al. | Sept. 27, 1927 |
| 2,321,417 | Pepersack | June 8, 1943 |
| 2,380,735 | Ebel et al. | July 31, 1945 |
| 2,423,965 | Coyle | July 15, 1947 |